(12) United States Patent
Gasser et al.

(10) Patent No.: US 11,003,491 B1
(45) Date of Patent: May 11, 2021

(54) OPTIMIZING BACKGROUND TASKS BASED ON FORECAST DATA

(71) Applicant: Amazon Technologies, Inc., Seattle, WA (US)

(72) Inventors: Timothy David Gasser, Seattle, WA (US); Chao Wang, Kirkland, WA (US)

(73) Assignee: Amazon Technologies, Inc., Seattle, WA (US)

( * ) Notice: Subject to any disclaimer, the term of this patent is extended or adjusted under 35 U.S.C. 154(b) by 120 days.

(21) Appl. No.: 16/138,413

(22) Filed: Sep. 21, 2018

(51) Int. Cl.
  *G06F 15/173* (2006.01)
  *G06F 9/48* (2006.01)
  *G06F 9/50* (2006.01)
  *G06F 7/58* (2006.01)
  *H04L 12/26* (2006.01)

(52) U.S. Cl.
  CPC ............ *G06F 9/4856* (2013.01); *G06F 7/588* (2013.01); *G06F 9/5088* (2013.01); *H04L 43/04* (2013.01); *H04L 43/0876* (2013.01)

(58) Field of Classification Search
  CPC ... H04L 43/04; H04L 43/0876; G06F 9/4856; G06F 7/588; G06F 9/5088
  USPC ......................................................... 709/224
  See application file for complete search history.

(56) References Cited

U.S. PATENT DOCUMENTS

| | | | | |
|---|---|---|---|---|
| 2012/0222032 | A1* | 8/2012 | Ferdous | G06F 11/3409 718/101 |
| 2013/0086273 | A1* | 4/2013 | Wray | G06F 9/5072 709/226 |
| 2013/0212165 | A1* | 8/2013 | Vermeulen | H04L 67/42 709/203 |
| 2016/0127184 | A1* | 5/2016 | Bursell | G06F 9/5072 709/221 |
| 2016/0275427 | A1* | 9/2016 | Buehrer | H04L 47/822 |
| 2019/0158422 | A1* | 5/2019 | Greenwood | H04L 43/0876 |
| 2019/0230185 | A1* | 7/2019 | Dhanabalan | H04L 12/1407 |
| 2019/0258527 | A1* | 8/2019 | Greeff | G06F 9/5077 |
| 2019/0363988 | A1* | 11/2019 | Dey | H04L 47/823 |
| 2019/0373060 | A1* | 12/2019 | Hrischuk | H04L 67/1097 |

* cited by examiner

*Primary Examiner* — Alan S Chou
(74) *Attorney, Agent, or Firm* — Nicholson De Vos Webster & Elliott LLP

(57) ABSTRACT

Techniques for optimizing background tasks based on forecast data are described. Customer workloads may be monitored by a local monitor in a first time period. Future customer workloads in a second time period following the first time period may be forecast based at least on the customer workloads using a local model. A background availability may be determined based at least on the future customer workloads. Execution of at least one background workload may be scheduled to use the background availability during the second time period. The local monitor may then cause the execution of the at least one background workload.

15 Claims, 10 Drawing Sheets

OPTIMIZING BACKGROUND TASKS BASED ON FORECAST DATA

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers. However, as the scale and scope of typical data centers has increased, the tasks of provisioning, administering, and managing the physical computing resources have become increasingly complicated.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span two or more physical resources, such as a single virtual machine with multiple virtual processors that spans multiple distinct physical computing systems. As another example, virtualization technologies may allow data storage hardware to be shared among multiple users by providing each user with a virtualized data store which may be distributed across multiple data storage devices, with each such virtualized data store acting as a distinct logical data store that provides users with the illusion that they are the sole operators and administrators of the data storage resource.

BRIEF DESCRIPTION OF DRAWINGS

Various embodiments in accordance with the present disclosure will be described with reference to the drawings, in which.

DETAILED DESCRIPTION

Various embodiments of methods, apparatus, systems, and non-transitory computer-readable storage media for optimizing background tasks based on forecast data are described. Multi-tenant systems host multiple customers on a shared resource. This increases the utilization of the multi-tenant resources on which different customers can be securely isolated from one another. The customers sharing a particular resource share the performance of that resource. For example, if one customer utilizes a large portion of a resource (e.g., CPU, GPU, bandwidth, etc.), the remaining portion of that resource is available for the other customers sharing it. These shared resources host customer workloads, which may be referred to herein as foreground tasks). Foreground tasks include customers executing code on compute instances, reading/writing to storage volumes stored on a block storage server, invoking serverless functions, etc.

However, in addition to the foreground tasks, the shared resources hosting multi-tenant workloads may also perform background tasks. These background tasks may be initiated by (and visible to) customers such as creating a storage volume from a storage snapshot. During volume creation, data may be downloaded from, e.g., an object storage service, to reassemble the volume on the block storage server. In other cases, the background task may be initiated by a provider network to, e.g., maintain service level agreement compliance, and ensure efficient running of the service. Provider network-initiated background tasks may not be visible to the customer. For example, compute instances may be load balanced across various host computers by live migrating a highly active compute instance from an overloaded host to a host with more available resources. During the process of live migration, the instance's memory contents are copied to the new host over the network.

Both customer-initiated and provider network-initiated background tasks utilize the same host resources as the foreground tasks. For example, the same network interface card (NIC) may be used to handle foreground requests and background requests. Because background tasks and foreground tasks both use host resources, there is potential for the execution of background tasks to impact the performance of foreground tasks.

Embodiments improve management of host resources in a multi-tenant system supporting foreground and background tasks over a shared interface. A local monitor can forecast customer workload in a next time period and determine an amount of bandwidth for background tasks to reduce interference with foreground performance This ensures the shared interface is used efficiently, without impacting customer foreground tasks.

Figure 1:
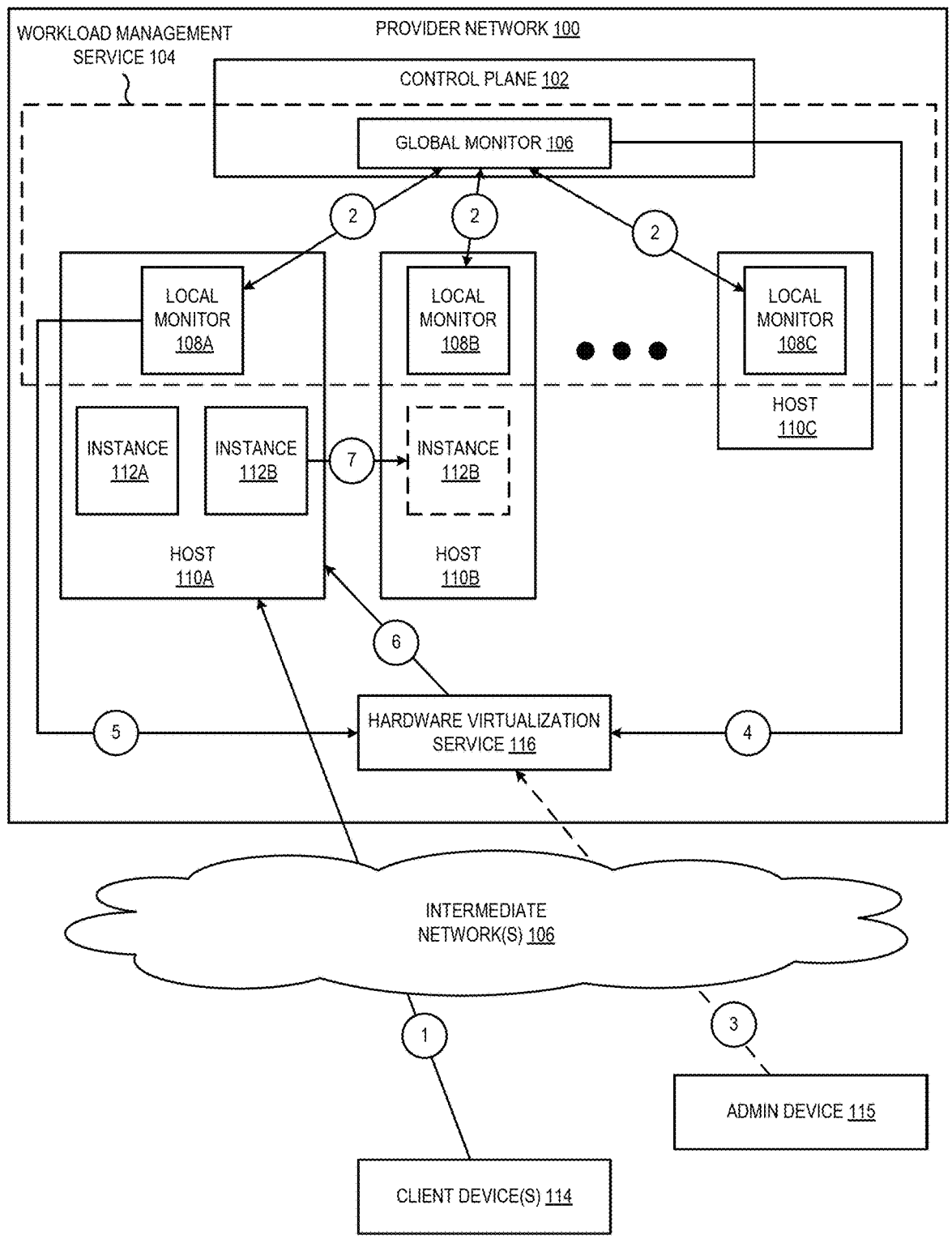
FIG. 1 is a diagram illustrating an environment for optimizing background tasks based on forecast data according to some embodiments.

FIG. 1 is a diagram illustrating an environment for optimizing background tasks based on forecast data according to some embodiments. A provider network 100 provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage), network-related resources (e.g., configuring virtual networks including groups of compute resources, content delivery networks (CDNs), Domain Name Service (DNS)), application resources (e.g., databases, application build/deployment services), etc. These and other computing resources may be provided as services, such as a hardware virtualization service that can execute compute instances, a storage virtualization service that can store data objects, etc. The users (or "customers") of provider network 100 may utilize one or more user accounts that are associated with a customer account, though these terms may be used somewhat interchangeably depending upon the context of use. Users may interact with a provider network 100 across one or more intermediate networks 106 (e.g., the internet) via one or more interface(s), such as through use of application programming interface (API) calls, via a console implemented as a website or application, etc. The interface(s) may be part of, or serve as a front-end to, a control plane 102 of the provider network 100 that includes "backend" services supporting and enabling the services that may be more directly offered to customers.

To provide these and other computing resource services, provider networks 100 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance hosted by the provider network to perform a variety of computing tasks, or may indirectly utilize a compute instance by submitting code to be executed by the provider network, which in turn utilizes a compute instance to execute the code (typically without the user having any control of or knowledge of the underlying compute instance(s) involved).

In some embodiments, a workload management service 104 can divide activity on each host 110A-110C into a set of non-overlapping windows with length 't' seconds. For each of these time windows, a local monitor 108A-108C can measure foreground activity during the time window. In some embodiments, current foreground activity can be appended to a trailing window of measurements (e.g., historical data) and the foreground activity can be statistically analyzed. The workload management service 104 can then forecast the foreground activity expected in the next time window based on the historical data. The forecast may include a prediction interval, which may include a range of activity values, for example a 90%, 99%, 99.5% prediction interval, etc. Based on the forecast activity, a leftover capacity can be calculated, and background tasks can be scheduled to utilize the leftover capacity. In some embodiments, the time window duration can be increased or decreased depending on the monitored foreground activity. This enables the workload management service to determine whether to use a longer time window (e.g., which may be less accurate but requires fewer system resources) or a shorter time window (e.g., which may be more accurate but requires more system resources).

As shown in FIG. 1, a workload management service 104 may be a distributed service with a hierarchy of monitors. The monitors may include a global monitor 106 implemented on a first one or more computing devices and a plurality of local monitors 108A-108C implemented on a second one or more computing devices (e.g., hosts 110A-110C). Each local monitor may be located on a different host 110A-110C which it is monitoring. In some embodiments, the local monitor 108 can be implemented on an offload card, on the host's hypervisor, or on the physical host. By using a distributed model, the forecasting prediction can be performed with low latency using the local monitors. The local monitors can be periodically updated by the global monitor based on fleetwide activity characteristics. Each host 110A-110C may include one or more instances 112A, 112B. These instances may be used to perform various customer workloads. For example, as shown at numeral 1, the instances on a host may receive requests from one or more client devices 114. For example, instance 112A and instance 112B may each be part of a different customer's application which may service requests from client devices 114. The local monitor 108A can monitor the traffic received by the host (e.g., the combined traffic of both instances). This traffic may be appended to a trailing window of traffic measurements (e.g., historical traffic data for host 110A).

In some embodiments, the local monitor 108 can use a block trace, network trace, or input/output (I/O) monitor to monitor activity on the host. The activity may be aggregated over the time window to determine the total activity (e.g., bandwidth, I/O operations, packets/second, data/second, requests/second, etc.) over a given time window. The types of activity monitored may determine the measurement technique used by the local monitor. In some embodiments, activity data may be obtained by the local monitors and/or global monitor through a measurement layer on each host that monitors activity on each host. Periodically, as shown at numeral 2, the local monitors can send activity data from each host 110 to the global monitor 106. The global monitor can calculate fleetwide activity statistics and trends. For example, the global monitor may include a global activity model which it may update based on the fleetwide data. When the global model has been updated, a model representation (e.g., model weights) can be transferred to the local monitors, for use in forecasting local foreground activity. In some embodiments, the global model may be a machine learning model trained to identify activity trends based on historical data. In some embodiments, the model representation sent to the local monitors may be a separate machine learning model based on the global model. For example, a local monitor deployed to a host monitoring compute instances may use a local model that has been trained using fleetwide traffic data for compute instances. Similarly, a local monitor deployed to a block storage server may use a local model that has been trained using fleetwide block storage traffic data. In some embodiments, as shown at numeral 3, a background task can be initiated by an administrator, such as by using admin device 115. The admin device 115 may send a request at numeral 3 through a web interface, console, or other interface, to initiate a migration of an instance. For example, the administrator who owns instance 112B may instruct hardware virtualization service 116 to live migrate the instance to another host. In some embodiments, hardware virtualization service 116 may migrate an instance without prior instruction, e.g., based on performance of the instance and/or the host (e.g., if the instance is too busy for the available resources on a given host, if a host fails, etc.). In either case, such a migration is a background task which will utilize the same host resources (e.g., NIC) as customer foreground tasks. The migration may be queued along with any other background tasks associated with the host. Each local monitor may include a scheduler, which enables the local monitor to determine which background tasks utilize the available resources during a time window.

Local monitor 108A can forecast the foreground activity during the next time window and subtract that forecast value from the available resources to determine the amount of resources that can be used by background tasks. In some embodiments, foreground activity can be measured as discussed above. This activity may be aggregated into a single value representing the amount of activity that took place over a time window. This aggregated value for the most recent time period (and optionally other past time windows) can be input to a local model in the local monitor. The local model (e.g., a machine learning model) can output a forecast activity interval (e.g., a 90%, 99%, 99.5% prediction interval). In some embodiments, the local model may additionally receive statistics calculated for the foreground activity, such as maximum and minimum activity, standard deviation, interquartile range, etc. The local model may also receive time of day, day of week, or other temporal information to use in forecasting the next interval. For example, some background activities may be scheduled at regular times (e.g., on the hour, every 15 minutes, every Friday, etc.). The local model can be configured to identify these patterns and forecast activity accordingly. In various embodiments, the foreground forecast can be made using a range of time-series modelling approaches (e.g. ARIMA, GARCH, exponential smoothing, etc.), and/or machine-learning models such as Gradient-Boosted Trees, Recurrent Neural Networks, or Convolutional Neural Networks.

Because the time windows are short, the local model may not be able to identify long term trends (e.g., seasonal activity variations). The global model may be a longer-term machine learning model that identifies long term trends based on fleetwide historical activity. The local model may be updated periodically based on the global model to account for seasonal changes in activity. In some embodiments, the forecast for the next interval may use the maximum activity of the previous interval and the maximum of the next interval. Similarly, 99% probability range for the previous interval can be calculated and the upper bound can be used as the maximum activity of the next interval. In some embodiments, additional information on the internal state (e.g., host state) of the shared resource may also be used for forecasting. For example, in a block storage server, increasing processor, memory, or log drive utilization may be a leading indicator of lower foreground traffic (e.g., as the shared interface is no longer acting as a bottleneck). Additionally, if memory consumption has increased that may correspond to buffering of a large number of I/O operations, which may indicate that the foreground traffic in the next time window will increase. If processor utilization is high over several time windows, then foreground traffic may be expected to be flat or drop, as fewer new tasks can be performed by the processor.

The forecast of foreground activity in the next time window can be used to calculate how much available resources (e.g., bandwidth, processor capacity, memory capacity, etc.) are available for background traffic. As discussed, the forecast may be in the form of a confidence interval. For example, a 95% interval means 95 out of 100 measured activity in the next time window falls inside the prediction range. To be conservative, the upper bound of the interval can be used. The interval used can be adjusted, for example to trade off more aggressive use of background bandwidth with higher risk of impacting to foreground traffic. Using the upper bound of the forecast interval, the local monitor 108A can subtract upper bound from the interface maximum capacity to determine the remaining capacity that can be used for background tasks. For example, an NIC may have a maximum bandwidth. The upper bound of the forecast traffic can be subtracted from this maximum to determine the available bandwidth for background tasks.

In some embodiments, at numeral 4, the global monitor 106 can determine which host is to receive the instance or instances that are being migrated. Because the global monitor receives activity data from local monitors distributed to various hosts 110, the global monitor can identify which host is to receive the migrated instance(s) based on the activity level of that host. For example, the global monitor 106 may identify a host with an activity level below a threshold value to receive a migrated instance(s). If multiple hosts are below the threshold activity level, the global monitor may migrate the instance(s) to different hosts, may select the host based on various criteria (e.g., the longest running host, shortest running host, host with the fewest other instances already running, etc.). The global monitor 106 may then instruct hardware virtualization service 116, and/or local monitor 108A, to migrate the instance(s) to the identified host (e.g., in this example host 110B).

Once the available capacity for background tasks is known, the local monitor can determine which background tasks are to be performed. Deciding which background task(s) can use the shared interface may be based on a number of criteria. For example, the local monitor can prioritize smaller background tasks (e.g., tasks requiring less data to transfer). Alternatively, longer-running background tasks may be prioritized to ensure that they complete. In some embodiments, if multiple instances 112 are being migrated, the one instance (e.g., 112B, may be selected to be migrated or the available capacity may be allocated across all or some of the pending migrations. At numeral 5, the local monitor can instruct the hardware virtualization service 116 to perform the migration during the time window. At numeral 6, the hardware virtualization service 116 can begin the migration of instance 112B from host 110A to host 110B. At numeral 7, the migration can occur using the available network traffic.

In some embodiments, background tasks may be prioritized based on time. For example, if a background task has been pending for more than a threshold amount of time, then that task may be assigned a higher priority. In some embodiments, background tasks may be scheduled based on a simulation, such as Monte Carlo simulations, of background tasks seen in the fleet. In some embodiments, background tasks may be prioritized depending on the underlying resource. For example, creating boot volumes from snapshots may be prioritized to reduce the amount of time a customer is waiting to set up a new instance. In some embodiments, priority rules may be defined which determine priority for a given task based on metadata associated with that task (e.g., amount of data being moved, size of volume, amount of memory being copied, number of CPUs, task start time, etc.).

Embodiments describe the global monitor as being part of control plane 102. However, in some embodiments, a global monitor may execute on a host 110. Each local monitor may then communicate with the global monitor executing on the host. In some embodiments, global monitor 106 may execute in control plane 102 and a secondary monitor may execute on a host 110. For example, global monitor 106 may determine a global model based on a global activity history as described herein and provide that data to the secondary monitor. The secondary monitor can also receive forecast data from each local monitor. Using the data from the global and local monitors, the secondary monitor may then control how and when background tasks are executed across the fleet. In some embodiments, the secondary monitor may be provided by the owner of a plurality of hosts in the fleet and may use additional information available to the owner about that plurality of hosts and the workloads being executed to manage background activities. For example, the owner may know that a current foreground workload will be completed in, e.g., five minutes. This knowledge may be used to coordinate execution of background tasks after the workload is completed. Similarly, if the execution of the workload were to cause the system to attempt to migrate one or more instances from the host executing the workload, the knowledge of the impending completion may be used to override the migration. Since the workload will be completed shortly, such a migration may have led to additional delays rather than improving overall performance In some embodiments, the global monitor, or secondary monitor described above, can be used to schedule containers to be executed on particular instances based on the amount of time required by the containers to execute.

In some embodiments, a customer, administrator, or other user can select particular instances, hosts, etc. to disable the above-described background task optimizations. For example, such optimizations may be disabled on short running instances, where such optimizations may lead to additional delays. In some embodiments, background task optimizations may be disabled based on customer ID, type of workload, types of instance, etc. based on past performance of those optimizations.

Figure 2:
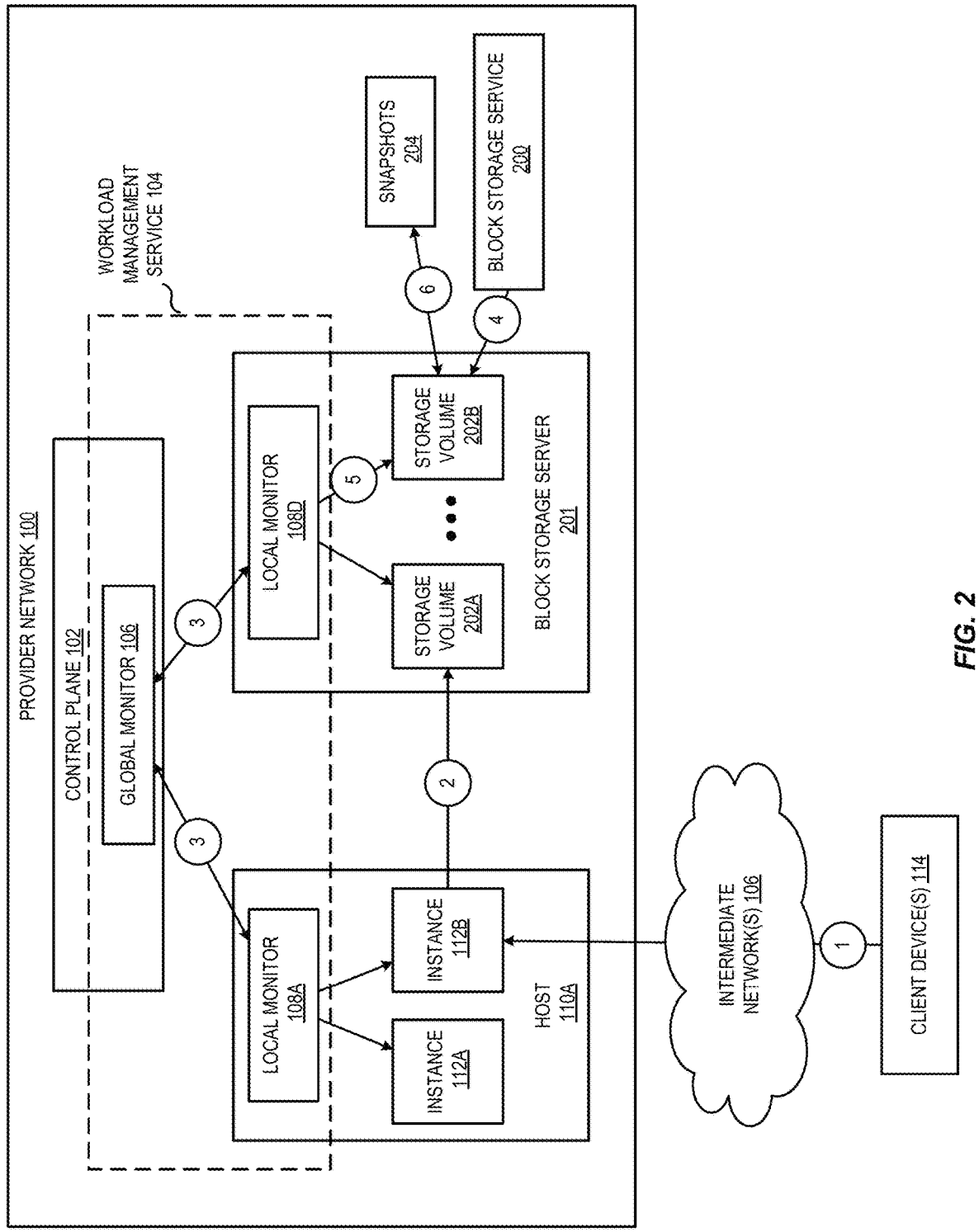
FIG. 2 is a diagram illustrating an alternative environment for optimizing background tasks based on forecast data according to some embodiments.

FIG. 2 is a diagram illustrating an alternative environment for optimizing background tasks based on forecast data according to some embodiments. FIG. 2 shows a simplified view of an environment having one host, however as described above with respect to FIG. 1 embodiments may include many hosts, each with its own local monitor. As shown in FIG. 2, a block storage server 201 may include multiple storage volumes 202A and 202B which are provided by a block storage service 200. Foreground activity in this example may include reading from and writing to the storage volume 202. For example, as shown at numeral 1, requests may be received from one or more client devices 114 by an instance 112B on host 110A. These requests may be serviced by instance 112B which, as shown at numeral 2, may result in reading and/or writing data from/to storage volume 202A. As shown at numeral 3, local monitors 108A and 108D can monitor this activity (e.g., of instance 112B and storage volume 202A, respectively) and accumulate the total activity over a time window. As discussed, each local monitor 108A and 108D may maintain an activity history which is periodically provided to global monitor 106. Global monitor 106 may also provide an updated model or model representation to the local monitor 108D for use in forecasting foreground traffic associated with the storage volume.

At numeral 4, block storage service 200 may instruct storage volume 202B to store a snapshot. Snapshotting is a background activity which may include snapshotting the storage volume periodically, on demand, or at other intervals. This background traffic can interfere with customer foreground traffic accessing the storage volume. As such, local monitor can determine an available capacity for the background task of snapshotting and, at numeral 5, can schedule the snapshotting of the storage volume, based on available capacity and task priority, as discussed above. This prevents the snapshotting of storage volume 202B from interfering with the foreground activity of storage volume 202A responding to requests from client devices 114. At numeral 6, the background snapshotting can be performed using the available capacity in the next time window.

Numeral 4 may alternatively represent another control operation, such as creating volume 202B from a snapshot 204. The storage volume 202B may be created from a snapshot in the background as storage volume 202A continues to provide read/write access to instances in the foreground. In some embodiments, creation of a volume may include both downloading data from the snapshot and downloading data from a master volume from which the new volume depends. This may include receiving data from a second block storage server that include the master volume. Both the downloading of the snapshot and the data from the master volume is performed in the background as scheduled by the local monitor 108D so as not to interfere with the foreground activity of storage volume 202A (or any other storage volumes on block storage server 201).

Figure 3:
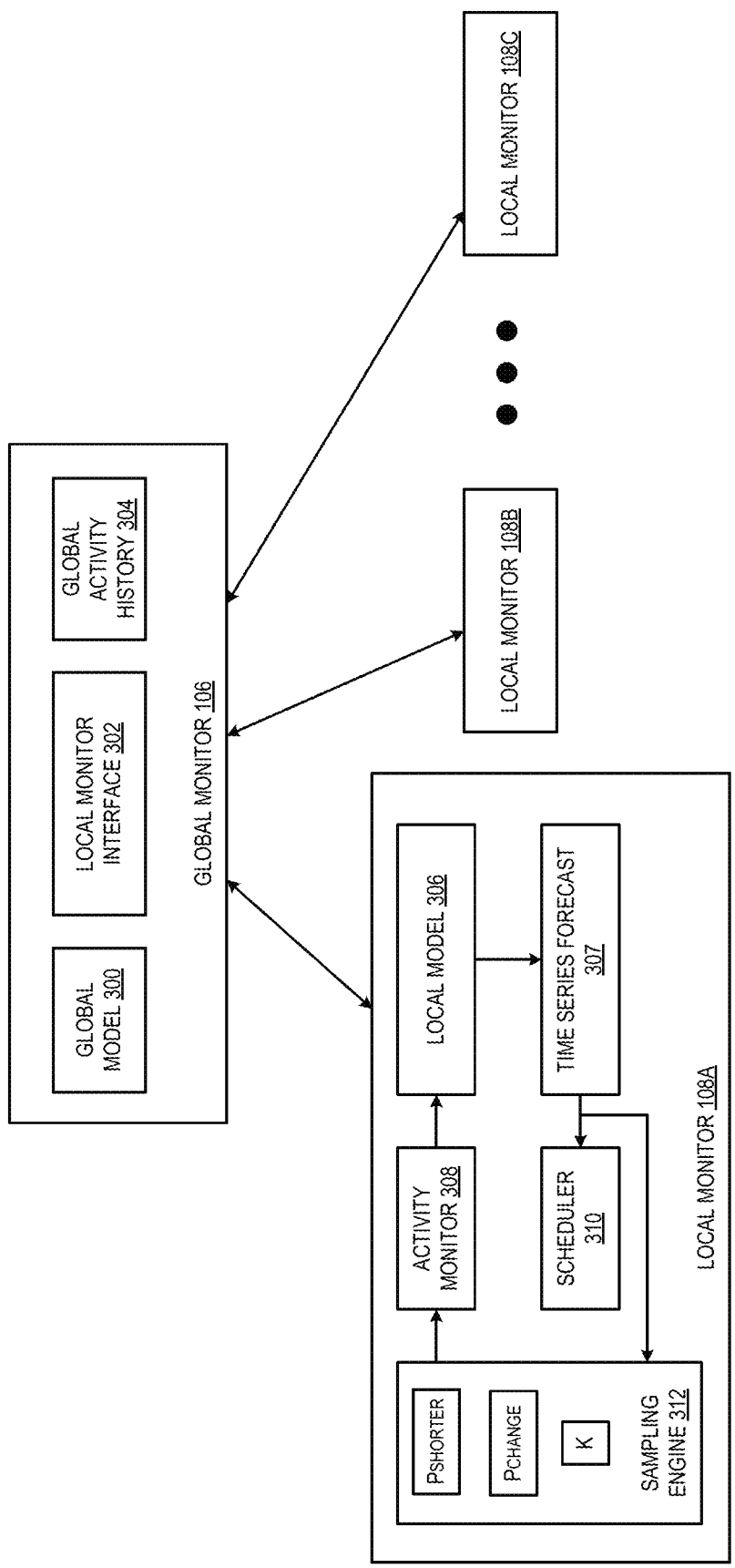
FIG. 3 is a diagram illustrating a workload monitoring service according to some embodiments.

FIG. 3 is a diagram illustrating a workload management service according to some embodiments. As shown in FIG. 3, global monitor 106 may include a global model 300, local monitor interface 302, and global activity history 304. Global model 300 can be a time-series model (e.g. ARIMA, GARCH, exponential smoothing, etc.), and/or machine-learning models (e.g., Gradient-Boosted Trees, Recurrent Neural Networks, or Convolutional Neural Networks). The global model 300 can be generated and/or updated based on global activity history 304 from a plurality of local monitors 108 distributed throughout a fleet of hosts. As discussed above, the global model may model activity trends over a longer time period which reveals long term (e.g., seasonal) trends in activity. The global monitor can send the model to each local monitor 108 through the local monitor interface 302. In some embodiments, a model representation (such as model weights), may be sent to each local monitor. In some embodiments, a new local model 306 may be generated based on the global model. The local model may be specific to a type of activity being monitored on a given host.

A local monitor may include the local model 306, time series forecast 307, an activity monitor 308, scheduler 310, and sampling engine 312. In some embodiments, the activity monitor 308 can be a traffic counter which saves the previous time window's activity value. The activity monitor can then be reset to zero and begin counting activity (e.g., traffic) until the end of the time window. The activity monitor may count up multiple activity dimensions. For example, when monitoring storage systems, it may record Input-Output Operations Per Second (IOPS) and MiB/s. When monitoring networking it may record Mbit/s and Packets Per Second (PPS). In some embodiments, the activity monitor can use a block trace, network trace, or other techniques to obtain host activity. In some embodiments, the activity monitor 308 can maintain an activity history (e.g., activity recorded for a configurable number of past time windows). The activity monitor can also maintain a history of statistics of the monitored activity, such as percentiles of activity of a previous number of time windows, mean, standard deviation, skew in distribution, etc. In some embodiments, activity monitor 308 can also include a host state monitor configured to determine host state, such as processor utilization, memory utilization, etc. The activity data and/or statistics can be provided as input to local model 306 and used to determine forecast activity for a next time window. The local model 306 can provide a time series forecast for a next time window based on the activity data and/or statistics received from the activity monitor. In some embodiments local model 306 can be continuously trained based on a difference between the time series forecast and the actual activity monitored by activity monitor 308.

Scheduler 310 enables the local monitor to determine which background tasks utilize the available resources during a time window. The time series forecast can be provided to scheduler 310 to determine how to allocate the forecast available bandwidth to background and foreground tasks during the next interval. For example, scheduler 310 may implement priority rules which determine priority for a given task based on metadata associated with that task (e.g., amount of data being moved, size of volume, amount of memory being copied, number of CPUs, task start time, etc.).

Sampling engine 312 can determine whether to modify the length of the time windows. For example, sampling engine 312 can be invoked at the end of each time window to determine whether to adjust the next time window, and whether that adjustment is to increase or decrease the time window. In some embodiments, a uniform random number in the range [0, 1) can be generated, and compared with a probability 'Pchange'. Pchange represents the probability that the time window is to be changed to a longer or shorter one. For example, if Pchange is 0.5 then the time window will be changed every other time window. Similarly, if Pchange is 0.1 then it will be adjusted once every ten windows, etc. If the random number is less than Pchange, the time window will be adjusted.

If the random number is less than Pchange, then a second random uniform number can be generated, and compared against the value 'Pshorter'. If the random number is less than 'Pshorter' a shorter time window is selected for the next 'N' windows. Otherwise, a longer time window is selected. Pchange and Pshorter may be determined based on local and/or fleetwide simulations. When the time window is being adjusted, it can be adjusted by constant 'k'. For example, k can be used to multiply or divide the time window 't' giving a new value of 't/k' or 't*k' seconds for a shorter or longer time window respectively. Other operations may be performed to modify the length of the time window using one or more constant values, such as adding or subtracting a constant value to or from the current time window. In various embodiments, the new time window is in effect for 'N' windows, after which a decision is made by comparing the adjusted time window distribution of traffic to the original time window distribution of traffic. The system biases towards having the longest window length possible, while keeping an upper bound on the tracking foreground activity. In some embodiments, multiple constants may be used to adjust the time window. For example, a 'Kshorter' constant may be used when decreasing the time window, and a 'Klonger' may be used when increasing the time window.

In some embodiments, the workload management service may have fixed limits of the maximum and minimum time windows that are supported. There is a tradeoff when adjusting the time window. For example, shorter time windows rapidly update forecasts, ensuring predictions track the actual foreground traffic patterns. However, this gives less time to make a forecast, increasing load on the system. Longer windows give more time for the prediction and measured data to diverge, but also more time for a prediction. The time window may be adjusted to be short enough to capture activity peaks and troughs, but not so short as to capture repetitive activity values. For example, if time window is too long, the traffic can diverge without being detected. This may result in inaccurate predictions for a long period of time.

In some embodiments, different comparison methods can be used when deciding whether to switch to the new window length permanently. For example, raw time domain distributions may be used to compare the variance of raw traffic values. This could use the normalized (standard deviation/mean) or inter-quartile range. If the variance is below a threshold with a shorter time window, then the time window can be reverted to its previous value. In some embodiments, the first difference of time domain can be used to determine the differences between time windows, which measures the bursty nature of the foreground traffic. In some embodiments, frequency domain analysis may be used. For example, longer measurement periods impose a lowpass filter with lower cutoff frequency. By switching to a shorter window, the sampling frequency increases, effectively increasing the cutoff of the lowpass filter. If there are frequency components above the original cutoff frequency, then the new time window should be used. The Power Spectral Density of the components above the cutoff frequency can be thresholded to decide whether to change. In some embodiments, the time series forecast 307 can be provided to the sampling engine 312 to determine whether to change the length of the time window. If the time series forecast over multiple consecutive time windows is the same value (or within a configurable margin of the same value), then the time window may be lengthened, as repeated values may indicate oversampling. Likewise, if the variation of forecast values is high (e.g., over a configurable threshold variance value), this may indicate undersampling, and the time windows may be shortened.

Figure 4:
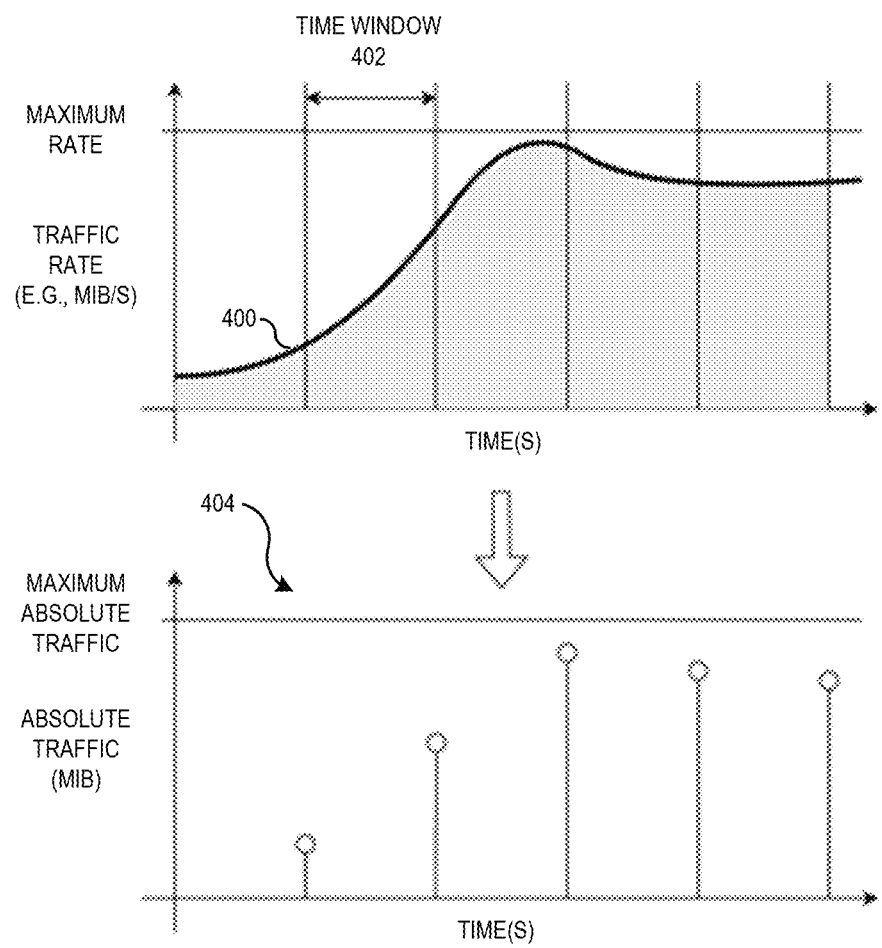
FIG. 4 is a diagram illustrating customer traffic over time according to some embodiments.

FIG. 4 is a diagram illustrating customer traffic over time according to some embodiments. As shown in FIG. 4, customer foreground traffic over time may be graphed as a smooth curve 400. As discussed, the activity in each time window may be accumulated. In some embodiments, at the beginning of each new time window 402, an activity monitor can save the previous time window's activity value. In the example shown in FIG. 4, the activity monitor can be a traffic counter which saves the previous time window's traffic value. The activity monitor can then be reset to zero and begin counting activity (e.g., traffic in this example) until the end of the time window. The activity monitor may count up multiple activity dimensions. For example, when monitoring storage systems, it may record Input-Output Operations Per Second (IOPS) and MiB/s. When monitoring networking it may record Mbit/s and Packets Per Second (PPS). The resulting accumulated values are shown at 404, with one value for each time window.

Figure 5:
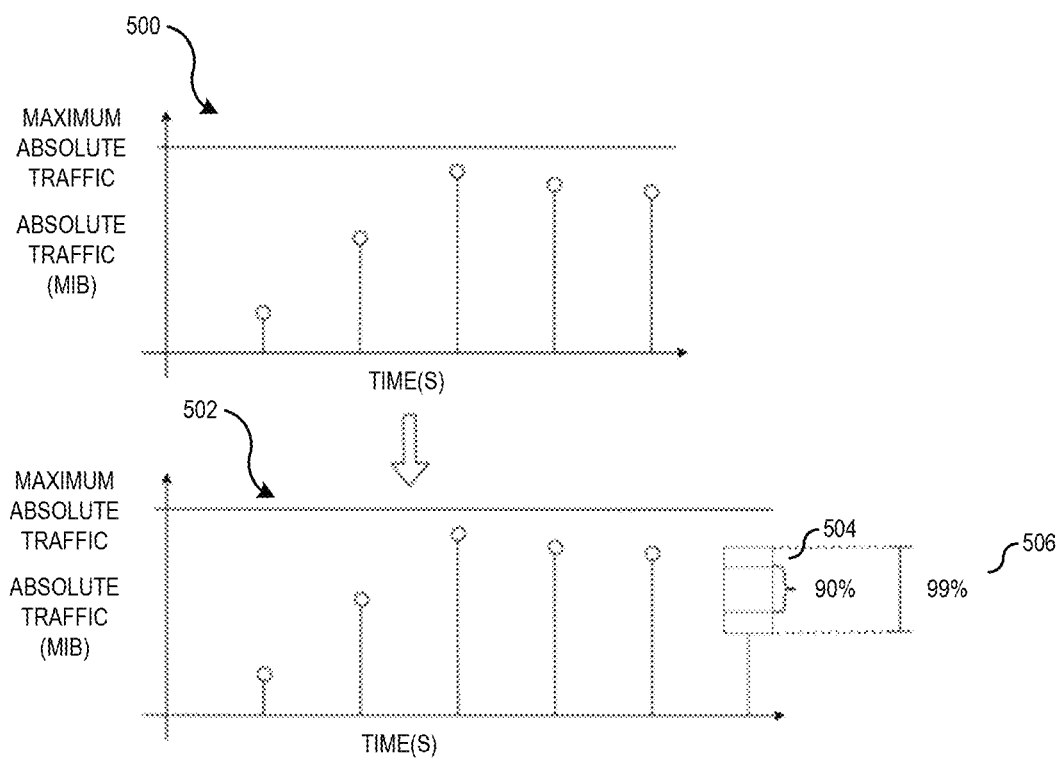
FIG. 5 is a diagram illustrating forecasting of customer traffic according to some embodiments.

FIG. 5 is a diagram illustrating forecasting of customer traffic according to some embodiments. As shown in FIG. 5, at 500 the accumulated activity totals are shown over time. As discussed above, the forecast activity value may be determined as a range of values, depending on the confidence interval in use. As shown at 502, the forecast activity value may vary depending on the confidence interval. For example, a 90% confidence interval 504 results in a narrower range of values than the 99% confidence interval 506. A 95% interval means 95 out of 100 measured future values fall inside the prediction range, and likewise a 99% interval means 99 out of 100 measured future values fall inside the prediction range. As discussed, to be conservative, the upper bound of the interval may be used. In some embodiments, the lower bound or a value in between may be used, such as a mean, median or other average value. In some embodiments, the value chosen for a given range may vary depending on the type of host, instance, volume, etc. performing the work, the type of workload, or other information about the work being performed.

Figure 6:
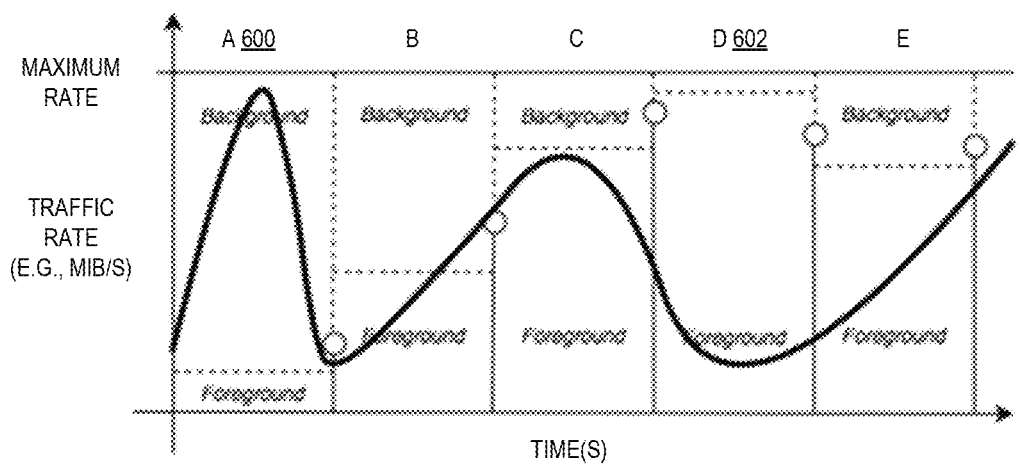
FIG. 6 is a diagram illustrating allocation of bandwidth to foreground and background workloads according to some embodiments.

FIG. 6 is a diagram illustrating allocation of bandwidth to foreground and background workloads according to some embodiments. As discussed above, the time window in use may be increased or decreased depending on the how well the forecast is tracking actual activity or based on time-domain or frequency domain analyses. As discussed, if the actual foreground traffic is lower than the forecast, there is additional capacity to drive more background traffic. In this case, there is no impact to foreground traffic, but we the underlying shared resource is not being fully utilized. Additionally, if the actual foreground traffic is higher than the forecast, the total traffic driven over the time window will exceed the shared interface, causing the performance of the foreground activity to be impacted leading to a worse customer experience. In the example shown in FIG. 6, the time windows are longer than the evolution of the traffic rate. For example, in window A 600 foreground traffic has been forecast to be low, leading a significant portion of the available capacity to be dedicated to background tasks. However, the foreground traffic spikes, leading to a poor customer experience. Similarly, in window D 602, foreground traffic is forecast to be high, however the actual foreground traffic is low. Leading to underutilization of the underlying resources. Such performance may lead to adjusting the time window period, as described above.

Figure 7:
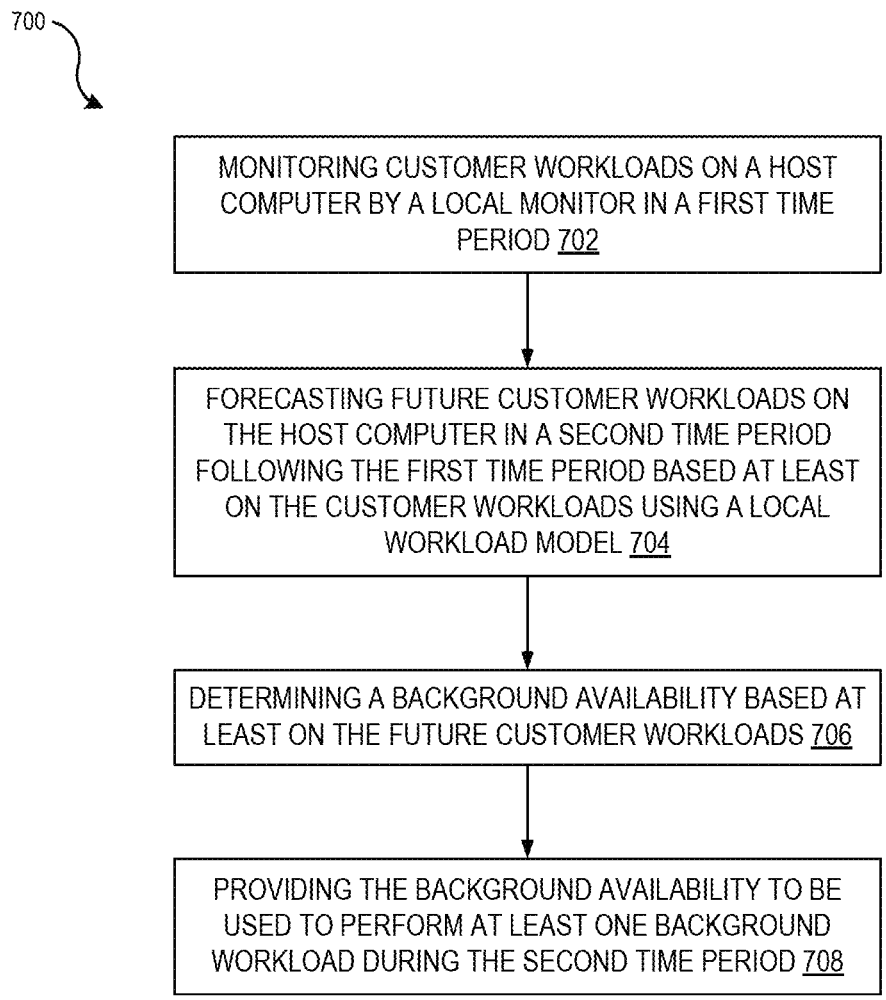
FIG. 7 is a flow diagram illustrating operations of a method for optimizing background tasks based on forecast data according to some embodiments.

FIG. 7 is a flow diagram illustrating operations 700 of a method for optimizing background tasks based on forecasting data according to some embodiments. Some or all of the operations 1000 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 1000 are performed by workload management service 104 including global monitor 106 and local monitors 108 of the other figures.

The operations 700 include, at block 702, monitoring customer workloads on a host computer in a first time period. The operations 700 include, at block 704, forecasting future customer workloads on the host computer in a second time period following the first time period based at least on the customer workloads using a local model. In some embodiments, forecasting may further include monitoring host state, the host state including one or more of processor utilization or memory utilization and estimating the future customer workloads based at least on the host state using the local model, wherein the local model comprises a machine learning model.

The operations 700 include, at block 706, determining a background availability based at least on the future customer workloads. The operations 700 include, at block 708, providing the background availability to be used to perform at least one background workload during the second time period. In some embodiments, the operations may further include scheduling execution of at least one background workload using the background bandwidth during the second time period. In some embodiments, scheduling may further include determining a priority associated with each background workload and scheduling each background workload to utilize the background bandwidth based at least on the priority of each background workload. The operations 700 may further include causing the execution of the at least one background workload.

In some embodiments, the operations 700, may further include receiving, by a global monitor, customer workload data from a plurality of local monitors, wherein each local monitor is on a different host computer. In some embodiments, the operations may further include updating a global model using the customer workload data from the plurality of local monitors. In some embodiments, the operations may further include determining an updated local model based at least on the updated global monitor and sending a representation of the updated local model to the local monitor on the host computer.

In some embodiments, the operations 700 may further include generating a first random number, determining the random number is less than a first probability value, and adjusting a length of a next time period. In some embodiments, adjusting a length of a next time period may further include generating a second random number, determining the second random number is greater that a second probability value, and increasing the length of the next time period using a first constant. In some embodiments, adjusting a length of a next time period may further include generating a second random number, determining the second random number is less that a second probability value, and decreasing the length of the next time period using a second constant.

In some embodiments, the at least one background workload data may include sending and/or receiving storage volume data from a storage volume snapshot or other storage server. In some embodiments, the at least one background workload may include creating storage volumes from storage volume snapshots, creating a second (e.g., redundant) copy of a storage volume, creating a storage volume snapshot from a storage volume, etc.

Figure 8:
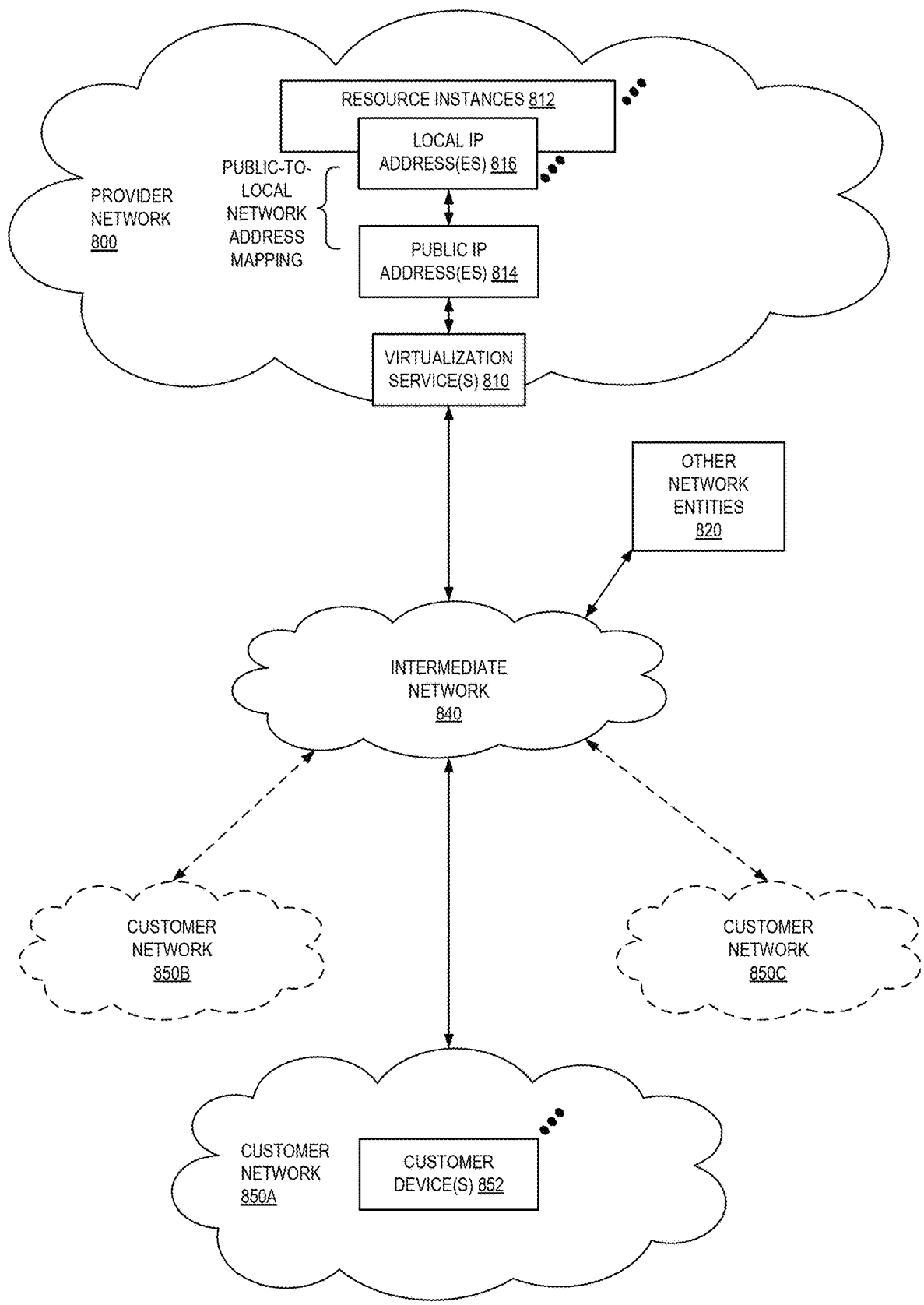
FIG. 8 illustrates an example provider network environment according to some embodiments.

FIG. 8 illustrates an example provider network (or "service provider system") environment according to some embodiments. A provider network 800 may provide resource virtualization to customers via one or more virtualization services 810 that allow customers to purchase, rent, or otherwise obtain instances 812 of virtualized resources, including but not limited to computation and storage resources, implemented on devices within the provider network or networks in one or more data centers. Local Internet Protocol (IP) addresses 816 may be associated with the resource instances 812; the local IP addresses are the internal network addresses of the resource instances 812 on the provider network 800. In some embodiments, the provider network 800 may also provide public IP addresses 814 and/or public IP address ranges (e.g., Internet Protocol version 4 (IPv4) or Internet Protocol version 6 (IPv6) addresses) that customers may obtain from the provider 800.

Conventionally, the provider network 800, via the virtualization services 810, may allow a customer of the service provider (e.g., a customer that operates one or more client networks 850A-850C including one or more customer device(s) 852) to dynamically associate at least some public IP addresses 814 assigned or allocated to the customer with particular resource instances 812 assigned to the customer. The provider network 800 may also allow the customer to remap a public IP address 814, previously mapped to one virtualized computing resource instance 812 allocated to the customer, to another virtualized computing resource instance 812 that is also allocated to the customer. Using the virtualized computing resource instances 812 and public IP addresses 814 provided by the service provider, a customer of the service provider such as the operator of customer network(s) 850A-850C may, for example, implement customer-specific applications and present the customer's applications on an intermediate network 840, such as the Internet. Other network entities 820 on the intermediate network 840 may then generate traffic to a destination public IP address 814 published by the customer network(s) 850A-850C; the traffic is routed to the service provider data center, and at the data center is routed, via a network substrate, to the local IP address 816 of the virtualized computing resource instance 812 currently mapped to the destination public IP address 814. Similarly, response traffic from the virtualized computing resource instance 812 may be routed via the network substrate back onto the intermediate network 840 to the source entity 820.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193, and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 800; a customer may then assign their allocated public IP addresses to particular resource instances allocated to the customer. These public IP addresses may be referred to as customer public IP addresses, or simply customer IP addresses. Instead of being assigned by the provider network 800 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 9:
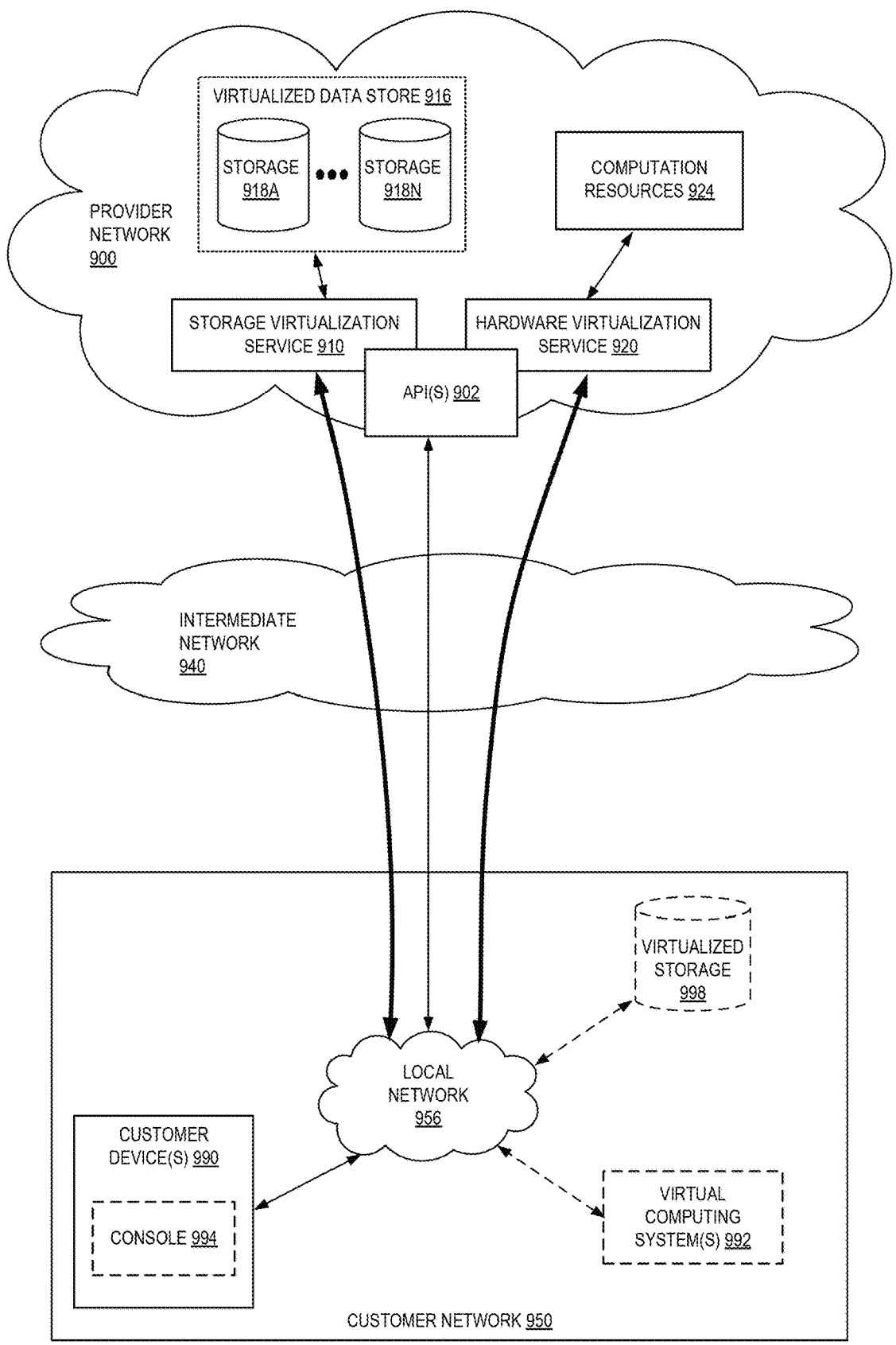
FIG. 9 is a block diagram of an example provider network that provides a storage virtualization service and a hardware virtualization service to customers according to some embodiments.

FIG. 9 is a block diagram of an example provider network that provides a storage virtualization service and a hardware virtualization service to customers, according to some embodiments. Hardware virtualization service 920 provides multiple computation resources 924 (e.g., VMs) to customers. The computation resources 924 may, for example, be rented or leased to customers of the provider network 900 (e.g., to a customer that implements customer network 950). Each computation resource 924 may be provided with one or more local IP addresses. Provider network 900 may be configured to route packets from the local IP addresses of the computation resources 924 to public Internet destinations, and from public Internet sources to the local IP addresses of computation resources 924.

Provider network 900 may provide a customer network 950, for example coupled to intermediate network 940 via local network 956, the ability to implement virtual computing systems 992 via hardware virtualization service 920 coupled to intermediate network 940 and to provider network 900. In some embodiments, hardware virtualization service 920 may provide one or more APIs 902, for example a web services interface, via which a customer network 950 may access functionality provided by the hardware virtualization service 920, for example via a console 994 (e.g., a web-based application, standalone application, mobile application, etc.). In some embodiments, at the provider network 900, each virtual computing system 992 at customer network 950 may correspond to a computation resource 924 that is leased, rented, or otherwise provided to customer network 950.

From an instance of a virtual computing system 992 and/or another customer device 990 (e.g., via console 994), the customer may access the functionality of storage virtualization service 910, for example via one or more APIs 902, to access data from and store data to storage resources 918A-918N of a virtual data store 916 provided by the provider network 900. In some embodiments, a virtualized data store gateway (not shown) may be provided at the customer network 950 that may locally cache at least some data, for example frequently accessed or critical data, and that may communicate with virtualized data store service 910 via one or more communications channels to upload new or modified data from a local cache so that the primary store of data (virtualized data store 916) is maintained. In some embodiments, a user, via a virtual computing system 992 and/or on another customer device 990, may mount and access virtual data store 916 volumes, which appear to the user as local virtualized storage 998.

While not shown in FIG. 9, the virtualization service(s) may also be accessed from resource instances within the provider network 900 via API(s) 902. For example, a customer, appliance service provider, or other entity may access a virtualization service from within a respective virtual network on the provider network 900 via an API 902 to request allocation of one or more resource instances within the virtual network or within another virtual network.

Illustrative System

Figure 10:
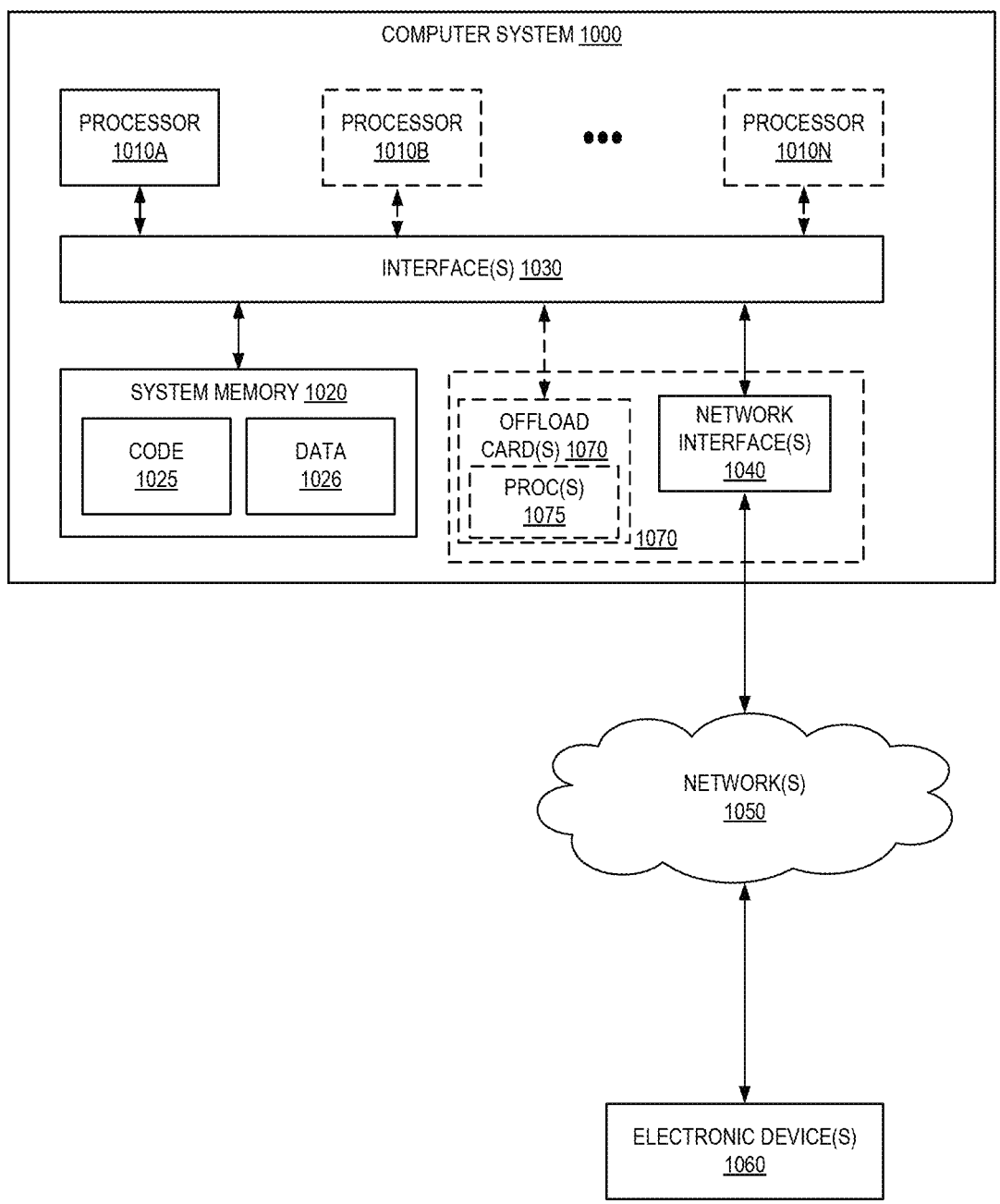
FIG. 10 is a block diagram illustrating an example computer system that may be used in some embodiments.

In some embodiments, a system that implements a portion or all of the techniques for optimizing background tasks based on forecast data as described herein may include a general-purpose computer system that includes or is configured to access one or more computer-accessible media, such as computer system 1000 illustrated in FIG. 10. In the illustrated embodiment, computer system 1000 includes one or more processors 1010 coupled to a system memory 1020 via an input/output (I/O) interface 1030. Computer system 1000 further includes a network interface 1040 coupled to I/O interface 1030. While FIG. 10 shows computer system 1000 as a single computing device, in various embodiments a computer system 1000 may include one computing device or any number of computing devices configured to work together as a single computer system 1000.

In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 1010 may commonly, but not necessarily, implement the same ISA.

System memory 1020 may store instructions and data accessible by processor(s) 1010. In various embodiments, system memory 1020 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for optimizing background tasks based on forecast data, are shown stored within system memory 1020 as code 1025 and data 1026.

In one embodiment, I/O interface 1030 may be configured to coordinate I/O traffic between processor 1010, system memory 1020, and any peripheral devices in the device, including network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments some or all of the functionality of I/O interface 1030, such as an interface to system memory 1020, may be incorporated directly into processor 1010.

Network interface 1040 may be configured to allow data to be exchanged between computer system 1000 and other devices 1060 attached to a network or networks 1050, such as other computer systems or devices as illustrated in FIG. 1, for example. In various embodiments, network interface 1040 may support communication via any suitable wired or wireless general data networks, such as types of Ethernet network, for example. Additionally, network interface 1040 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 1000 includes one or more offload cards 1070 (including one or more processors 1075, and possibly including the one or more network interfaces 1040) that are connected using an I/O interface 1030 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 1000 may act as a host electronic device (e.g., operating as part of a hardware virtualization service) that hosts compute instances, and the one or more offload cards 1070 execute a virtualization manager that can manage compute instances that execute on the host electronic device. As an example, in some embodiments the offload card(s) 1070 can perform compute instance management operations such as pausing and/or un-pausing compute instances, launching and/or terminating compute instances, performing memory transfer/copying operations, etc. These management operations may, in some embodiments, be performed by the offload card(s) 1070 in coordination with a hypervisor (e.g., upon a request from a hypervisor) that is executed by the other processors 1010A-1010N of the computer system 1000. However, in some embodiments the virtualization manager implemented by the offload card(s) 1070 can accommodate requests from other entities (e.g., from compute instances themselves), and may not coordinate with (or service) any separate hypervisor.

In some embodiments, system memory 1020 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1000 via I/O interface 1030. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 1000 as system memory 1020 or another type of memory. Further, a computer-accessible medium may include transmission media or signals such as electrical, electromagnetic, or digital signals, conveyed via a communication medium such as a network and/or a wireless link, such as may be implemented via network interface 1040.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 108A-108D, 110A-110D, 112A-112C, etc.) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
    monitoring customer workloads by a local monitor on a host computer in a first time period;
    forecasting future customer workloads on the host computer in a second time period following the first time period based at least on the customer workloads using a local model;
    determining a background availability based at least on the future customer workloads;
    providing the background availability to be used to perform at least one background workload during the second time period;
    generating a first random number;
    determining the random number is less than a first probability value; and
    adjusting a length of a next time period.

2. The computer-implemented method of claim 1, further comprising:
    receiving, by a global monitor, customer workload data from a plurality of local monitors, wherein each local monitor is on a different host computer.

3. The computer-implemented method of claim 2, further comprising:
    updating a global model using the customer workload data from the plurality of local monitors.

4. The computer-implemented method of claim 3, further comprising:
    determining an updated local model based at least on the updated global model and the customer workloads; and
    sending a representation of the updated local model to the local monitor on the host computer.

5. The computer-implemented method of claim 1, wherein adjusting a length of a next time period further comprises:
    generating a second random number;
    determining the second random number is greater that a second probability value; and
    increasing the length of the next time period using a first constant.

6. The computer-implemented method of claim 1, wherein adjusting a length of a next time period further comprises:
    generating a second random number;
    determining the second random number is less that a second probability value; and
    decreasing the length of the next time period using a second constant.

7. The computer-implemented method of claim 1, wherein forecasting future customer workloads on the host computer in a second time period following the first time period based at least on a local model further comprises:
    monitoring host state, the host state including one or more of processor utilization or memory utilization; and
    estimating the future customer workloads based at least on the host state using the local model, wherein the local model comprises a machine learning model.

8. The computer-implemented method of claim 1, further comprising:
    determining that the forecast customer workloads over a plurality of consecutive time periods are within a margin of one another; and
    increasing a length of the next time period using a first constant.

9. A system comprising:
    a workload management service comprising:
        a global monitor implemented by a first one or more electronic devices; and
        a plurality of local monitors implemented by a second one or more electronic devices, each local monitor service including instructions that upon execution cause the local monitor to:
            monitor customer workloads on a host computer in a first time period;
            forecast future customer workloads on the host computer in a second time period following the first time period based at least on the customer workloads using a local model, the local model received from the global monitor;
            determine a background availability based at least on the future customer workloads;
            providing the background availability to be used to perform at least one background workload during the second time period;
            generate a first random number;
            determine the random number is less than a first probability value; and
            adjust a length of a next time period.

10. The system of claim 9, wherein the global monitoring service includes second instructions that upon execution cause the global monitor to:
receive customer workload data from a plurality of local monitors, wherein each local monitor is on a different host computer.

11. The system of claim 10, wherein the second instructions, when executed, further cause the global monitor to:
update a global model using the customer workload data from the plurality of local monitors.

12. The system of claim 11, wherein the second instructions, when executed, further cause the global monitor to:
determine an updated local model based at least on the updated global model and the customer workloads; and
send a representation of the updated local model to the local monitor on the host computer.

13. The system of claim 9, wherein to adjust a length of a next time period, the instructions when executed further cause the local monitor to:
generate a second random number;
determine the second random number is greater that a second probability value; and
increase the length of the next time period using a first constant.

14. The system of claim 9, wherein to adjust a length of a next time period, the instructions when executed further cause the local monitor to:
generate a second random number;
determine the second random number is less that a second probability value; and
decrease the length of the next time period using a second constant.

15. The system of claim 9, wherein to forecast future customer workloads on the host computer in a second time period following the first time period based at least on a local workload mode, the instructions when executed further cause the local monitor to:
monitor host state, the host state including one or more of processor utilization or memory utilization; and
estimate the future customer workloads based at least on the host state using a machine learning model.

* * * * *